United States Patent

Chang

[11] Patent Number: 5,884,555
[45] Date of Patent: Mar. 23, 1999

[54] GRIDDLE STRUCTURE

[75] Inventor: Li-Chen Wu Chang, TaoYuan, Taiwan

[73] Assignee: Lyd Jan Co., Ltd., Taiwan

[21] Appl. No.: 74,729

[22] Filed: May 7, 1998

[51] Int. Cl.⁶ .............................. A47J 37/00; A47J 37/06
[52] U.S. Cl. ................................ 99/425; 99/400; 99/445; 99/446; 99/447
[58] Field of Search .............................. 99/375, 400, 401, 99/408, 422–425, 444–446, 447, 449, 450; 126/25 R, 41 R, 51, 261, 383, 246; 219/386, 430, 439, 521

[56] References Cited

U.S. PATENT DOCUMENTS

| | | | |
|---|---|---|---|
| 850,058 | 4/1907 | Ross | 99/425 |
| 1,732,910 | 10/1929 | Possons | 99/425 |
| 2,703,078 | 3/1955 | Hammond, Jr. | 99/425 |
| 2,774,295 | 12/1956 | Watkins | 99/425 |
| 3,308,747 | 3/1967 | Spagnolo | 99/400 |
| 3,407,723 | 10/1968 | Varkala | 99/349 |
| 3,418,921 | 12/1968 | Fautz | 99/445 |
| 3,842,726 | 10/1974 | Fautz | 99/445 X |
| 3,938,431 | 2/1976 | Potvin | 99/375 X |
| 4,352,324 | 10/1982 | Noh | 99/425 |
| 4,606,261 | 8/1986 | Bernardi | 99/446 X |
| 5,237,914 | 8/1993 | Carstensen | 99/450 X |
| 5,365,038 | 11/1994 | Mitsugu | 219/386 |

Primary Examiner—Timothy F. Simone
Attorney, Agent, or Firm—Ostrolenk,Faber,Gerb & Soffen, LLP

[57] ABSTRACT

A griddle structure with an oil conductor to direct the flow of oil or grease through through holes out of the griddle plate. One or more collecting devices at the base container of the griddle structure collects grease and may be removed from the griddle plate. The through holes of the griddle plate communicate through holes in an intermediate reflective plate and those in turn, communicate with the collecting devices at the base container. One face of the griddle plate is formed with a flat concave surface to perform multiple functions. The other face has strips across it.

8 Claims, 8 Drawing Sheets

GRIDDLE STRUCTURE

FIELD OF THE INVENTION

The present invention relates generally to a griddle structure, and in particular to a griddle structure having a griddle plate and a metallic reflective plate in which one or more of through holes are formed at suitable positions on the griddle plate and on the reflective plate respectively. One or more removable collectors or an oil outlet pipe are formed on the base for receiving grease drip or conducting oil out of the griddle plate.

BACKGROUND OF THE INVENTION

Grilles are popular for family occasions for making steak, toast, or the like and are normally an accessory part of the oven. Nevertheless, some people think such grilles are inconvenient since they prefer the fun of making steak on the table and/or furthermore, to use the grille for outdoor barbecue. The portable griddle structure is developed to overcome the size problem of the oven.

However, the present griddle structures are disadvantageous from at least the following points:

1. No oil conductor, or the like is found in the conventional griddle structure to remove exceed grease from making steak or the like out of the grille during cooking;
2. There is no drip collector for collecting the grease dripping from making steak or the like;
3. Since no oil conductor and/or the collecting units is found in the conventional grille, the process of cleaning the griddle structure becomes cumbersome, troublesome and nasty for those who are washing it. Just imagine, how do you like to have your hand or glove filled with grease?

Furthermore, the design of the conventional grille is not healthy for our diet. While making steak, or the like, grease remains with the steak and a substantial amount of the animal fat is taken in which increases the cholesterol level in our body. This could give rise to weight and heart problems, produce obesity and even cause death.

SUMMARY OF THE INVENTION

It is therefore a primary object of the present invention to provide a griddle structure with at least an oil conductor which directs oil to flow out of the griddle plate.

It is a secondary object of the present invention to provide a griddle structure with one or more through holes formed on the sloped groove structure of the griddle plate such that oil or grease gather at a defined position to be led away from the griddle plate.

It is a third object of the present invention to provide the griddle structure with one or more removable collecting means, preferably at the base container, for grease collection.

It is a further object of the present invention to provide a griddle structure in which the other face of the griddle plate is formed as a pan to perform multiple functions.

Other features and advantages of the present invention will become apparent from the following description of the invention which refers to the accompanying drawings.

DETAILED DESCRIPTION OF THE PREFERRED EMBODIMENTS

Figure 1:
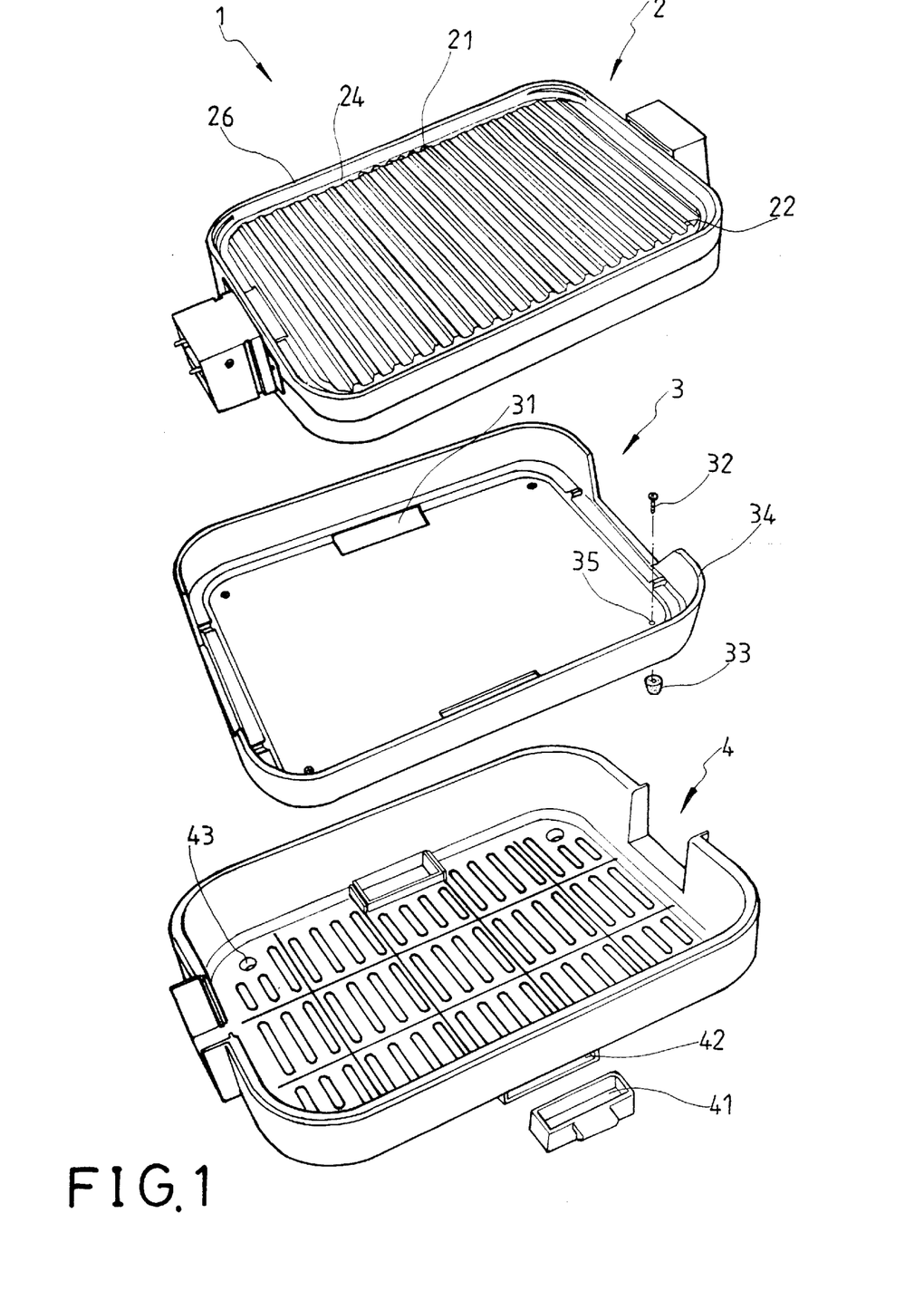
FIG. 1 is an exploded view of an improved griddle structure according to the present invention.
Figure 2:
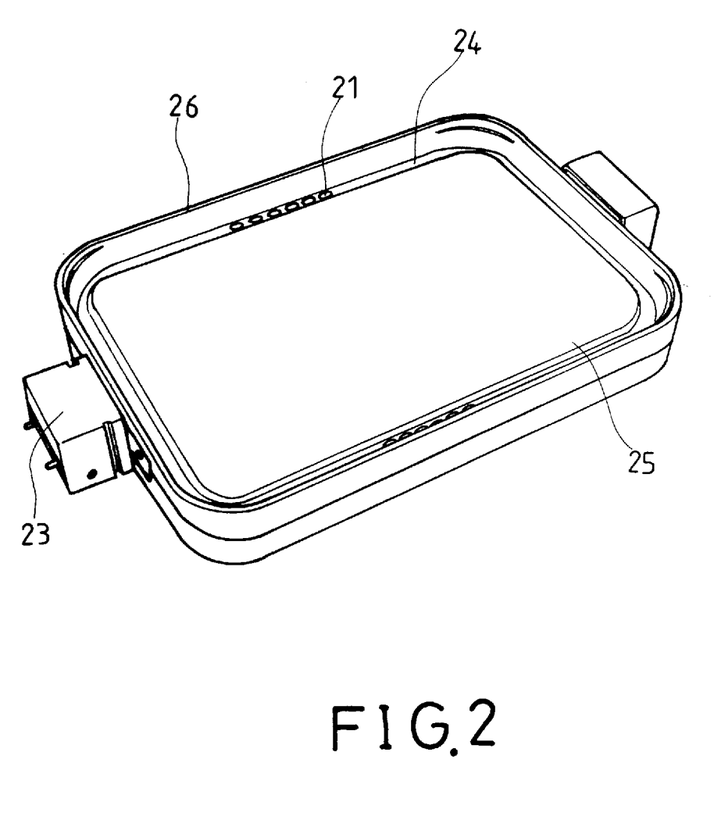
FIG. 2 shows the alternative opposite face of the griddle plate.
Figure 3:
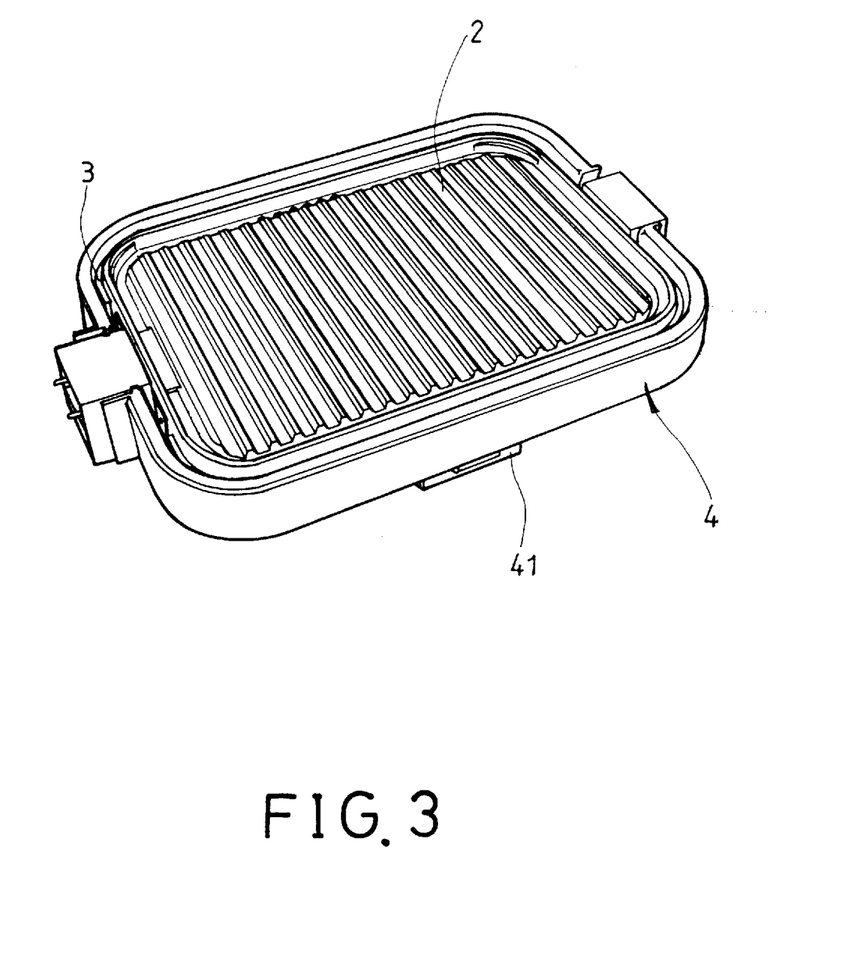
FIG. 3 is a perspective view of the assembled griddle structure according to the present invention.

Referring to the drawings, and particularly to FIGS. 1, 2 and 3 defining the first embodiment, a griddle structure 1 is shown, comprising a griddle plate 2, a reflective plate 3, and a base container 4. The griddle plate 2 is formed with two recessed faces, one with wave-shaped strips 22 and the other face being a flat surface 25. A groove 24 is formed between each of the concave faces 22, 25 and the upward rim 26, next to each groove, with the groove having a slope. One or more through holes 21 are formed at the bottom of the slope of the groove. Two handles 23 are attached to two ends of the griddle plate. One is the power receiver from an external power supply.

The reflective plate 3 is made of a reflective material, preferably metal, and has two openings formed on the rim 34 of the reflective plate 3 for placement of the handles 23. The plate is placed between the base container 4 and the griddle plate 2 for heat collection is and storage. A plurality of through holes 31 are formed in the base of the reflective plate 3 next to the rim 34 and are positioned with respect to the through holes 21 of the griddle plate 2 to allow the dripping grease to pass through. A screw hole 35 is at each corner of the reflective plate 3 receives an inserted screw 32 to be affixed to a block 33 to maintain a distance between the reflective plate 3 and the base container 4.

The base container 4 has two openings for the insertion of the handles 23 of the griddle plate 2. Collecting means 41 are built in the base container 4 and act as a drawer which is removably inserted into a cavity 42. The collecting means 41 is positioned with respect to the through holes 21 of the griddle plate 2 and through holes 31 of the reflective plate 3 to receive dripping grease therein from steak or the like.

Figure 4:
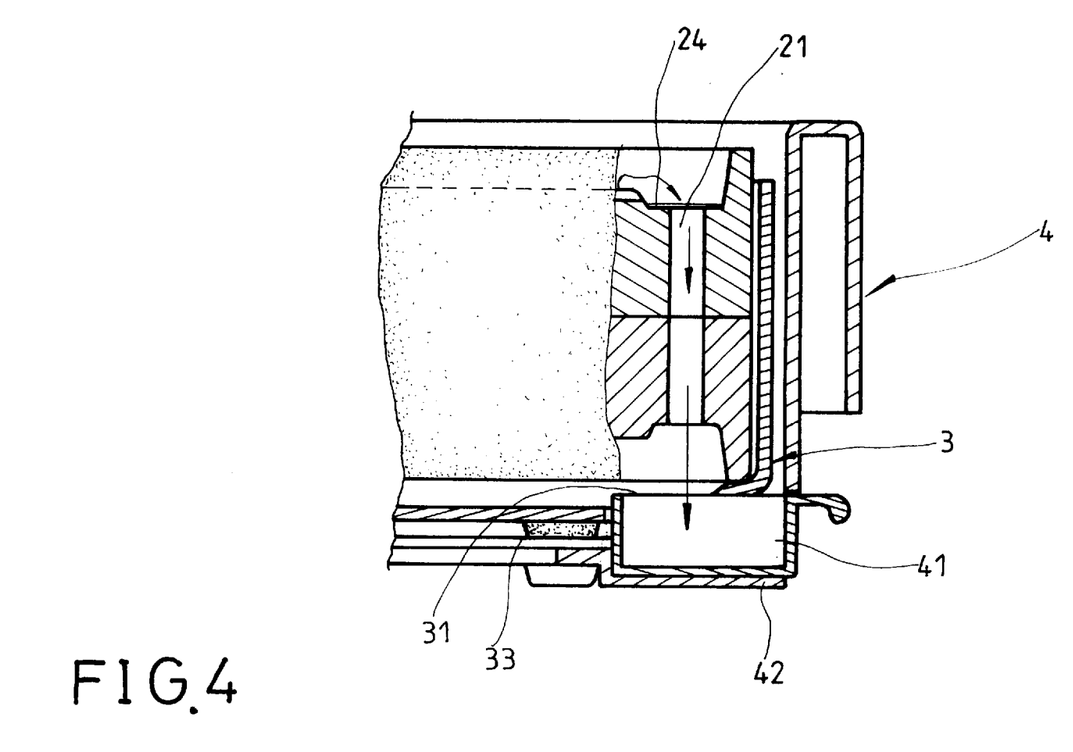
FIG. 4 is the cross sectional view of a fragment of the griddle structure showing the direction of the drip flow according to the present invention.
Figure 5:
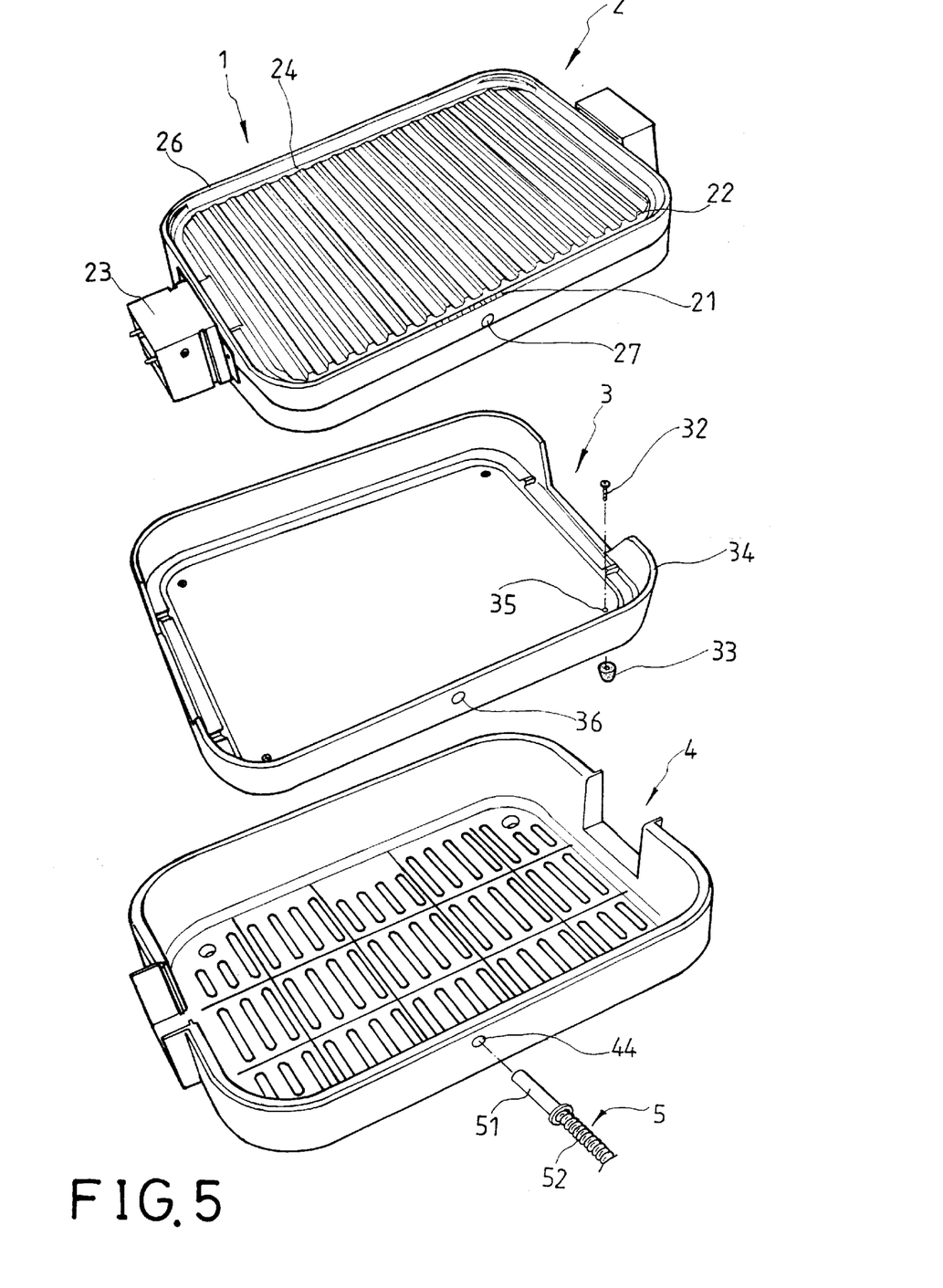
FIG. 5 is an exploded view of a second embodiment of an improved griddle structure according to the present invention.
Figure 6:
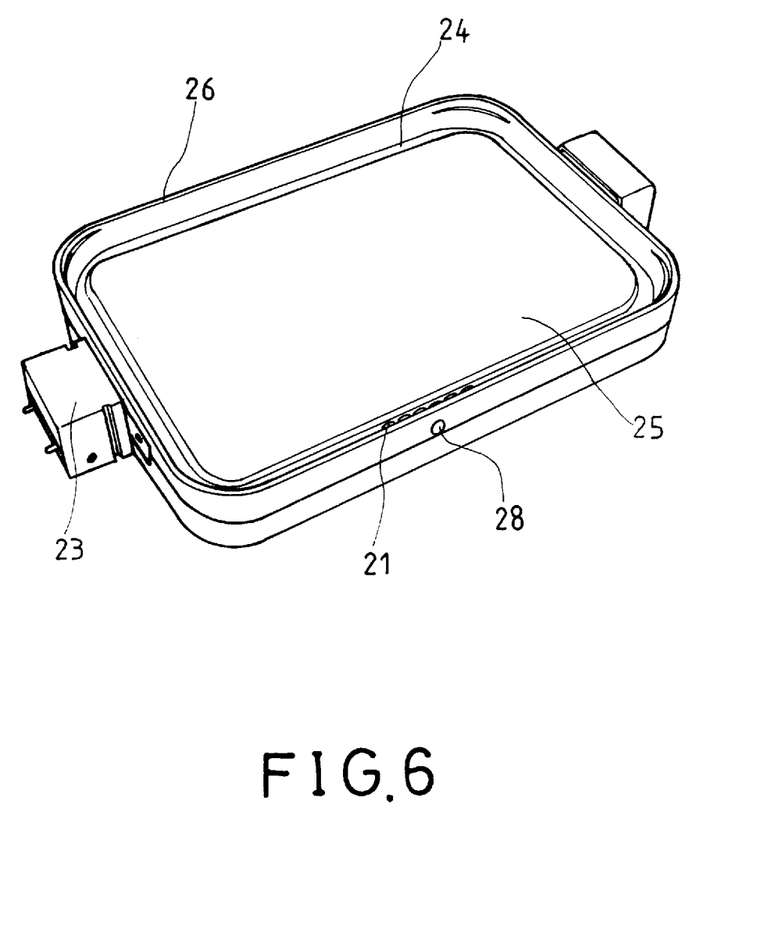
FIG. 6 shows the alternative opposite face of the griddle plate in the second embodiment.
Figure 7:
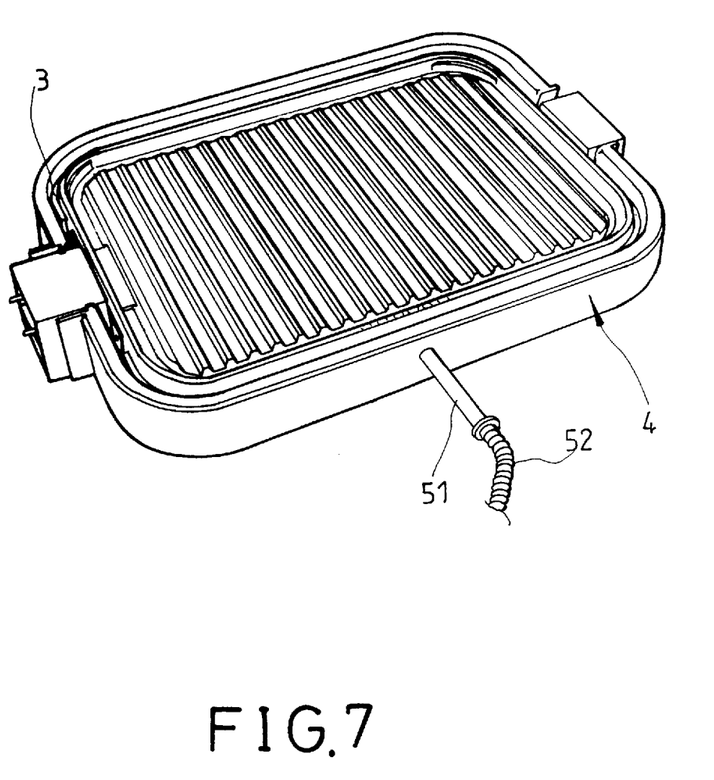
FIG. 7 is a perspective view of the assembled second embodiment of the griddle structure according to the present invention.
Figure 8:
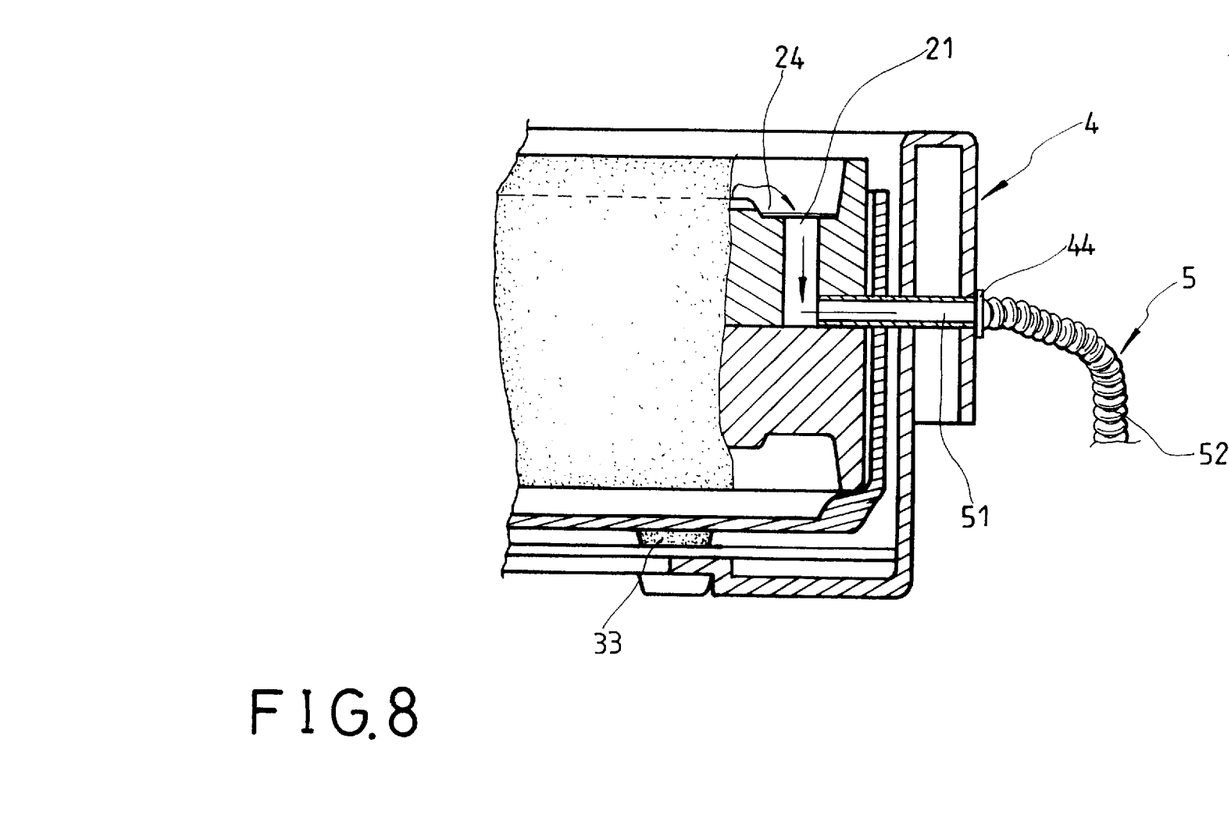
FIG. 8 is a cross sectional view of a fragment of the second embodiment of the griddle structure showing the direction of the drip flow according to the present invention.

In FIG. 4, the arrow indicates the flow of the grease drip. Firstly, the grease leaves the surface of the griddle plate 2 into the groove 24 and then passes the through hole 21. It then passes through the through hole 31 and is received by the collecting means 41. Once the drip stops and/or the collecting mean 41 is full, the collecting mean 41 may be removed for cleaning up.

FIGS. 5 to 8 show the griddle structure 1 defining the second preferred embodiment. This griddle structure 1 also comprises a griddle plate 2, a reflective plate 3 and a base container 4. It further comprises the oil conducting pipe 5. The plurality of through holes 21 from the griddle plate 2 come together at the through hole 27 which is bent at an angle away from the griddle plate 2. It receives the oil outlet pipe which directs grease away from the griddle plate 2. The pipe 5 is heat resistant and is formed of two parts, the solid part 51 and the flexible part 52. The solid part 51 of the pipe 5 is inserted into the through hole 27 through the through holes 36 and 44 of the reflective plate 3 and base container 4, respectively. The flexible part 52 of the pipe 5 past the solid part and is bent toward the desired direction toward an external collecting mean (not shown).

While the structure and features of the present invention have become apparent from the above detailed description and illustrations, it will be understood by the person skilled in the art that various changes in form and detail may be made without departing from the spirit and scope of the invention. Although only the preferred embodiments of this invention were shown and described in the above description, it is requested that any modification or combination that come within the spirit of this invention be protected.

What is claimed is:

1. A griddle structure, comprising:

a griddle plate having a rim, a groove in the plate next to the rim, at least one first through hole through the plate and in the groove;

a plate shaped reflector below the griddle plate and being shaped to extend below the at least one first hole in the groove of the griddle plate, the reflector having at least one second through hole through the reflector;

a base container located below the reflector and having at least one third hole positioned for receiving grease or oil that has passed through the first and second holes;

a plurality of handles affixed to the griddle plate, the base container having openings at locations to receive and being shaped to receive the handles, and the base container openings being positioned and shaped to allow firm fixation of the handles on the griddle plate to the base container.

2. The griddle structure of claim 1, wherein there are a plurality of the first through holes along the groove in the griddle plate.

3. The griddle structure of claim 2, wherein the first holes in the groove are in a row.

4. The griddle structure of claim 1, further comprising a main exit hole from the griddle plate, and the first holes in the griddle plate being connected together to merge into the exit hole from the griddle plate.

5. The griddle structure of claim 4, further comprising an oil and grease conductor connected to the main lead hole from the griddle plate.

6. The griddle structure of claim 1, further comprising a removable collector below each of the third holes of the base container.

7. The griddle structure of claim 1, wherein the griddle plate has opposite faces, one of the faces of the griddle plate having a plurality of strips thereon, the other face being a flat pan face.

8. The griddle structure of claim 7, wherein the first groove is formed on each of the opposite faces of the griddle plate for directing the flow of grease and oil toward the at least one first through hole through the griddle plate.

* * * * *